July 3, 1934.  J. W. ALLEN  1,965,024
YIELDING COUPLING
Filed May 29, 1930  2 Sheets-Sheet 1
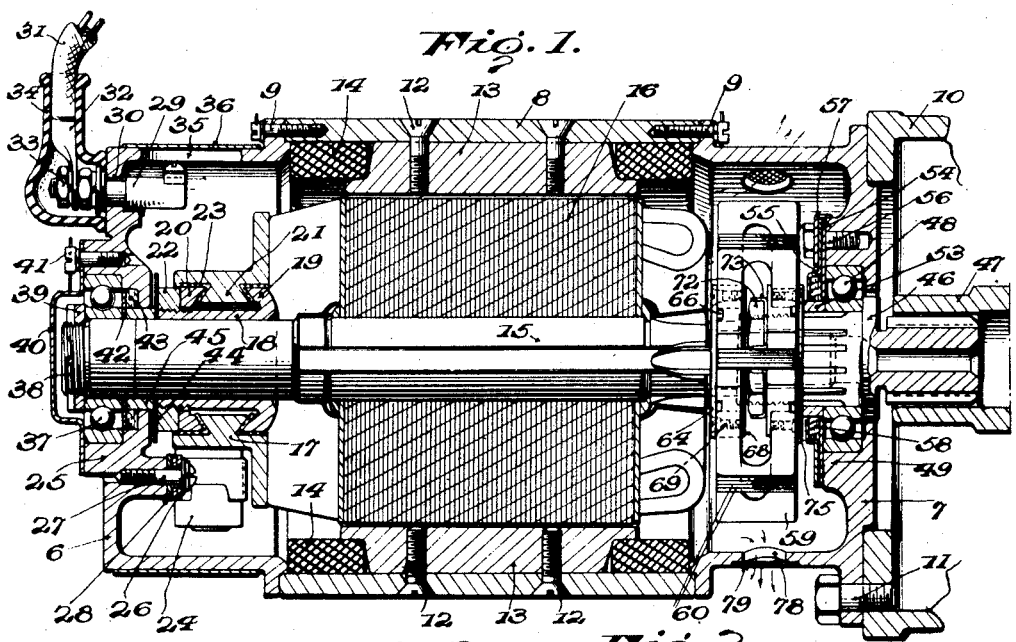
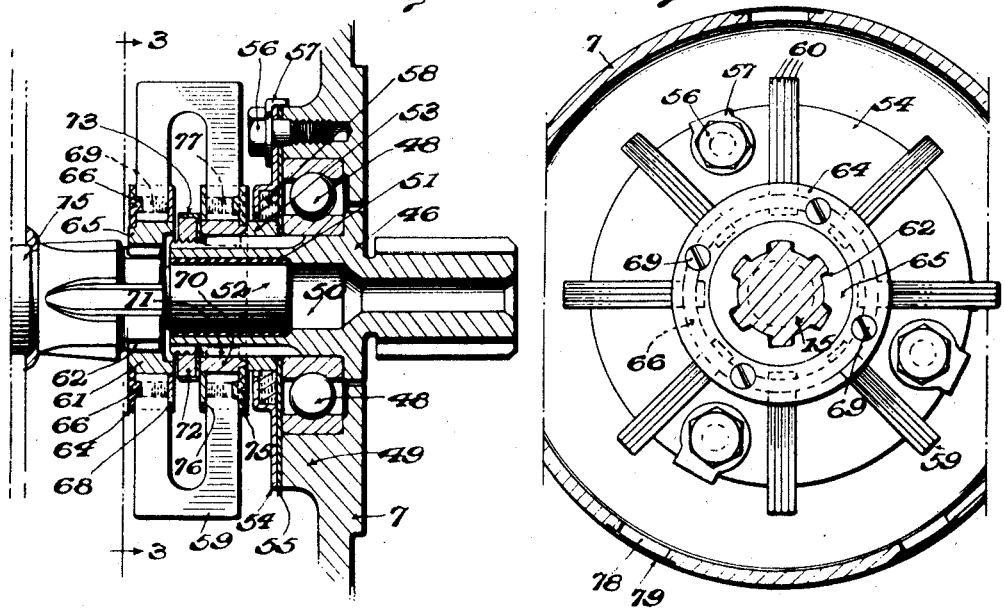
Inventor
Joseph W. Allen.
Attorney

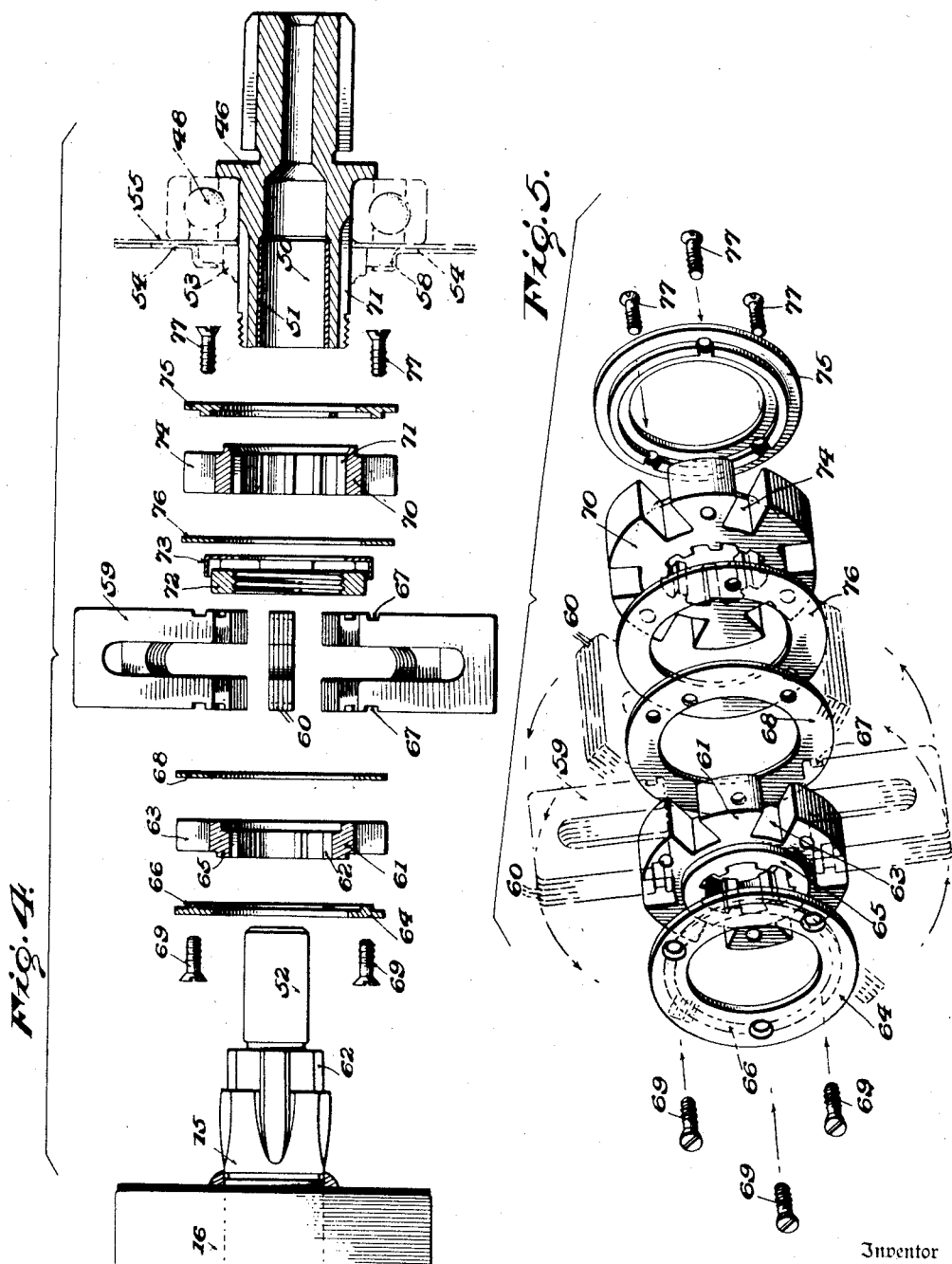

Patented July 3, 1934

1,965,024

UNITED STATES PATENT OFFICE 1,965,024

YIELDING COUPLING

Joseph W. Allen, East Orange, N. J., assignor to Eclipse Aviation Corporation, East Orange, N. J., a corporation of New Jersey Application May 29, 1930, Serial No. 457,477

15 Claims. (Cl. 64—96)

This invention relates to coupling devices, and more particularly to yielding means for connecting a driving member to a driven member.

One of the objects of the present invention is to provide a novel resilient driving connection between a driven member and a driving member which is simple in structure and assembly, cheap of manufacture, and yet efficient in operation to absorb any torsional vibration which may exist in the driving member, and to prevent its transmission to the driven member.

Another object is to provide a combined coupling and fan for generators which will serve both to prevent the transmission of torsional vibration to the generator armature and to maintain a circulation of air within the generator casing while said generator is running.

A further object is to provide a novel driving connection for an aircraft generator which comprises a plurality of springs, such springs also acting as the blades of a fan to cool the generator while running.

These and other objects will appear more fully in the detailed description of the invention which follows. Although only one embodiment of the present invention is illustrated in the accompanying drawings, it is to be expressly understood that these drawings are for the purposes of illustration only and are not to be construed as a limitation of the scope of the invention, reference being had for this purpose to the appended claims.

In the drawings:

Fig. 1 is a side elevation, partly in section, of one embodiment of the present invention;

Fig. 2 is a sectional view in detail of the coupling shown in Fig. 1;

Fig. 3 is a sectional view taken on line 3—3 of Fig. 2;

Fig. 4 is a drawn out sectional view similar to Fig. 2, but showing each of the component parts of Fig. 2 separately; and Fig. 5 is a drawn out view in perspective of the principal parts shown in Fig. 4.

Referring now to the drawings, wherein like reference characters indicate like parts throughout the several views, Fig. 1 illustrates one embodiment of the present invention in combination with an aircraft generator of the usual type which is driven by a member of the aircraft engine. The generator comprises in general, a framework or casing carrying the pole shoes, field coils, and brushes, and a rotor suitably journaled in said frame and carrying the armature winding and coupling means. In the embodiment shown, the generator casing consists of a front head 6, a back head 7 and a yoke 8. Yoke 8 is positioned between the front and back heads and secured thereto by any suitable means such as screws 9. The casing is also detachably secured to a portion of the engine casing 10 by means of screws 11. Positioned within and secured to the middle portion of yoke 8 by means of screws 12 is a set of pole shoes 13, preferably four in number, around which are wound in the usual manner, field coils 14.

The rotor of the generator is of the usual type and comprises an armature shaft 15, an armature coil assembly 16, and a commutator 17. Coil assembly 16 and commutator 17 are held in proper position on shaft 15 by means of a sleeve 18 having a beveled portion 19 and a beveled retaining ring 20, between which beveled members a similar mortised portion 21 of the commutator 17 is gripped by the action of a nut 22, which is threaded onto the front end of sleeve 18 and bears against retaining ring 20. Insulating members 23 are inserted between the commutator and the sleeve and retaining ring.

A pair of commutator brushes 24 bear against commutator 17 and each is suitably attached to and insulated from a boss 25 formed in front head 6 as by means of a bracket 26, a screw 27 and insulator 28. Brushes 24 are connected by the usual jumper wiring (not shown) to terminal posts 29 (only one shown) supported in front head 6 and insulated therefrom by insulating bushings 30. The usual electrical leads 31 are connected to terminal posts 29 as by means of terminal lugs 32 and nuts 33. A terminal post cover 34 is also provided to shield each of these connections. An opening or window 35 is provided in a portion of the periphery of front head 6 for the purpose of inspecting and adjusting the brush equipment. This opening is normally closed by means of a window strap 36.

The front end of armature shaft 15 is suitably journaled in boss 25 by means of a ball bearing 37 and is provided with a threaded portion 38 upon which a slotted nut 39 is placed to prevent longitudinal movement of shaft 15 and bearing 37. A front bearing cover 40 secured to front head 6 as by screws 41, is also provided to maintain bearing 37 in a proper position and to protect the end of shaft 15. Interposed between bearing 37 and a portion of boss 25 is a retaining washer 42 and a leather washer 43 which act as an oil seal. An oil thrower ring 44 is provided surrounding shaft 15 and is maintained in proper position within front head 6 by means of a spacer sleeve 45.

At the rear end of the armature shaft novel coupling means are provided for resiliently connecting the generator to its source of rotation, which means also serves as a fan to maintain a circulation of air within the casing while the generator is running. Although this source of rotation may be any of the usual prime movers, in the present embodiment it is assumed to be the crank shaft, or some extension thereof, of an aircraft engine, and the armature shaft is shown connected thereto by the novel form of resilient coupling.

As shown more clearly in Fig. 2, a short driving shaft 46 is provided for splined engagement with a portion of the engine crank shaft 47 (Fig. 1) and rotates therewith. This driving shaft 46 is suitably journaled by means of a ball bearing 48 in a boss 49 formed in the back head 7 of the generator casing, and is coaxial with and resiliently connected to armature shaft 15 through the novel form of spring coupling. Shaft 46 also forms the bearing for the rear end of armature shaft 15, being provided for this purpose with a recess 50 containing a bushing 51 in which a reduced portion 52 of armature shaft 15 is journaled.

Ball bearing 48 is maintained in its proper position within boss 49 by any suitable means such as a spacer sleeve 53 surrounding shaft 46, a bearing retainer 54, and a retainer washer 55, the latter two elements being secured to back head 7 by means of screws 56 fitted with screw locks 57. A leather washer 58 is interposed between bearing retainer 54 and retainer washer 55 at their inner peripheries to act as an oil seal.

The novel form of combined spring coupling and fan which resiliently connects driving shaft 46 with armature shaft 15 comprises in general a plurality of flat horseshoe-shaped springs 59, and means for operatively connecting one end of each spring to the driving shaft and the other end to the armature shaft. The springs are so mounted that their flat sides are substantially coplanar with the axis of rotation of shafts 15 and 46, and thus act as the blades of a centrifugal fan upon rotation.

Each spring 59 preferably consists of a plurality of laminations 60, although it is to be understood that the springs need not be laminated.

One end of each spring 59 is operatively connected to armature shaft 15 as by means of a spring collar 61. Collar 61 rotates with shaft 15 but has longitudinal movement relative thereto due to its splined connection therewith as shown at 62. Collar 61 is also provided with a plurality of radial grooves 63 in its outer periphery in which the spring ends are inserted (see Fig. 5). A spring retaining ring 64 then abuts one face of collar 61, fitting over a hub portion 65, and is provided with an annular projection or lug 66, which engages corresponding grooves 67 formed in the edges of springs 59, thus holding said springs against outward radial movement. A second retaining ring 68 abuts the opposite face of collar 61, and all three members of the collar assembly are rigidly secured together as by means of screws 69. One end of each spring 59 is thus effectively secured to armature shaft 15 for rotation therewith.

The other end of each spring 59 is similarly connected to driving shaft 46 by means of a spring collar 70. The latter is splined to shaft 46 for rotation therewith as at 71, and is held against longitudinal movement relative thereto by means of a nut 72 threaded onto the end of shaft 46 and forcing said collar against spacer sleeve 53. A cup washer 73 is provided between nut 72 and collar 70. The ends of springs 59 are secured to collar 70 in grooves 74 by means of retaining rings 75 and 76, and screws 77 in a manner similar to that described for collar 61.

A plurality of vent openings 78 fitted with screens 79 may be provided in the periphery of back head 7 to aid in the circulation of air within the generator casing.

The action of the present invention during operation is as follows: With the armature shaft and the driving shaft at rest, the springs assume a natural, unflexed position. When the engine is started, the driving shaft receives a sudden impulse of torque upon initial rotation. Due to the resiliency of the spring coupling, however, this sudden shock is not transmitted directly to the armature but is smoothed out by the flexure of the springs. Also, during normal running operation, a state of torsional vibration continually exists in the crank shaft of the driving engine, which is especially severe in the case of V-type engines. Were the spring coupling not effective as an absorbing agent, this vibration would be transmitted to the armature shaft, and might materially shorten the life of and damage the generator. In addition to their resilient coupling action, the spring blades in rotating are given sufficient pitch by the opposite torque of the driving shaft and driven armature to act as the blades of a centrifugal fan drawing the heated air from around the armature and coil windings, and exhausting it through the screened vents in the casing.

There is thus described a novel coupling device which may be used with generators and which combines the advantages of a resilient driving connection between the armature and driving shaft, with those of a centrifugal fan for maintaining the air within the generator casing in circulation while the generator is running. The structure of said device is novel, extremely simple, and cheap to manufacture and assemble, and is yet efficient to prevent the transmission to the armature of the torsional vibration set up in the driving shaft and to simultaneously act as a fan in cooling the interior of the generator casing. There are thus combined in the same structure, the advantages of two or more separate devices, the use of which greatly increases the efficiency and life of electrical apparatus.

It will be obvious that the invention is not limited to the specific form shown in the accompanying drawings, but it capable of a variety of mechanical embodiments. For example, any suitable form of spring or blade may be substituted for the type shown herein, or the number of springs may be varied to secure a greater fan effect. Likewise, any suitable means for operatively connecting the springs to the two shafts may be substituted for the means illustrated. Various other changes which will now appear to those skilled in the art may be made in the form, details of construction, and arrangement of the parts without departing from the spirit of the invention, and reference is therefore to be had to the appended claims for a definition of the limits of the invention.

What is claimed is:

1. A resilient coupling device for connecting a driving and a driven shaft comprising a plurality of flat flexible springs of horseshoe shape, a pair of collars, one of said collars being drivably secured to each of said shafts, each of said collars having a plurality of radial slots circumferentially spaced in the outer periphery thereof, and means for retaining the ends of each spring within said slots in the respective collars, the remainder of each spring projecting radially from the peripheries of said collars and having its flat side substantially coplanar with the axes of said shafts.

2. A coupling device for connecting a generator shaft and a driving shaft comprising a plurality of flat, flexible blades, a pair of collars having radial slots in the outer periphery thereof, one of said collars being drivably connected to each of said shafts, and means for securing the ends of each blade within said slots in the respective collars, the remainder of each blade projecting radially from the peripheries of said collars and forming the blades of a fan.

3. A coupling device for electrical apparatus of the type having an armature shaft adapted to be driven by a member of an engine, comprising a driving shaft coaxial with the armature shaft, and means for resiliently connecting said shafts, said means including a plurality of flexible blades extending radially from the axes of said shafts and forming a centrifugal fan for cooling said electrical apparatus.

4. In a coupling device, a driving shaft, a driven shaft coaxial therewith, a plurality of flat flexible members, and means for operatively connecting the ends of each of said members to the respective shafts, the flat sides of said members being substantially coplanar with the axes of said shafts and the members extending radially therefrom, said members being adapted to act both as a resilient driving connection between the shafts and as the blades of a centrifugal fan.

5. In a coupling device, a driving shaft, a driven shaft coaxial therewith, a plurality of flexible members, and means for operatively connecting each of said members to both shafts, said members extending radially from the axes of said shafts and adapted to act both as a resilient driving connection between the shafts and as a centrifugal fan.

6. A coupling device for connecting a driving shaft and a driven shaft, comprising a plurality of flat spring blades, and means for connecting the ends of said blades to the respective shafts, the flat sides of said blades being substantially coplanar with the axes of said shafts, and said blades being adapted to act both as a resilient driving connection between the shafts and as the blades of a centrifugal fan.

7. A coupling device for connecting a driving shaft and a driven shaft comprising a plurality of flat spring blades, and means for operatively connecting the ends of each of said blades to the respective shafts, said blades being adapted to act as a resilient driving connection between the shafts and as a centrifugal fan.

8. A coupling device for connecting a driving shaft and a driven shaft comprising a plurality of flexible members extending radially from the axes of the shafts to form blades, and means for operatively connecting each of said members to both shafts so that during operation said blades are imparted a pitch thereto and operate as a fan.

9. In combination with a generator having an armature shaft, a driving shaft coaxial therewith, a casing surrounding said generator and shafts, and means including a plurality of flexible members drivably connecting said shafts, said means being adapted to act both as a resilient driving connection between the shafts to provide torsional resiliency therebetween and as a centrifugal fan in maintaining a circulation of air within said casing.

10. In combination with a generator of the type having an armature shaft adapted to be driven by a member of an engine, a driving shaft coaxial with the armature shaft, a casing surrounding said generator and shafts, a plurality of flat spring blades, and means for operatively connecting the ends of each of said blades to the respective shafts, said blades forming both a resilient driving connection between the shafts and a centrifugal fan for cooling the interior of said generator and casing.

11. In combination with an aircraft generator of the type having an armature shaft adapted to be driven by a member of an aircraft engine, a driving shaft operatively connected with the engine member and coaxial with said armature shaft, a casing surrounding said generator and shafts, and a combined resilient coupling device and fan comprising a plurality of flat flexible blades, and means for operatively connecting the ends of each blade to the respective shafts, said blades projecting radially from said shafts and having their flat sides substantially coplanar with the axes of said shafts.

12. A coupling device for connecting a driving shaft and a driven shaft comprising a plurality of U-shaped flexible blades spaced apart and having flat portions extending in radial planes which pass through the axes of the shafts, and means for connecting the ends of the blades to their respective shafts so that said blades provide torsional resiliency between the driving and driven shafts and are adapted to have a pitch imparted thereto by the opposite torques of said shafts during the operation of the latter, whereby said blades operate as a fan.

13. A coupling device for connecting a driving shaft and a driven shaft comprising a plurality of U-shaped flexible blades spaced apart, and means for connecting the ends of the blades to their respective shafts, the said blades being radially disposed with respect to the shafts and adapted to operate as a fan.

14. In combination, a driving shaft, a driven shaft, and flexible coupling means between said shafts for providing torsional resiliency therebetween, said coupling means also comprising the blades of a fan, which blades are adapted to have a pitch imparted thereto by the operation of the shafts in order to circulate air around said shafts.

15. A yielding coupling adapted to drivably connect a driving member and a driven member for providing torsional resiliency between said members and forming the blades of a fan, which blades are adapted to have a pitch imparted thereto by the opposite torques of the members which it connects, when said members are rotating.

JOSEPH W. ALLEN.